(12) United States Patent
Matsubara et al.

(10) Patent No.: US 11,146,129 B2
(45) Date of Patent: Oct. 12, 2021

(54) ROTOR OF ELECTRIC ROTATING MACHINE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Masakatsu Matsubara, Mie (JP); Yusuke Matsuoka, Yokkaichi (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

(*) Notice: Subject to any disclaimer, the term of this patent is extended or adjusted under 35 U.S.C. 154(b) by 142 days.

(21) Appl. No.: 16/599,705

(22) Filed: Oct. 11, 2019

(65) Prior Publication Data

US 2020/0044501 A1    Feb. 6, 2020

Related U.S. Application Data

(63) Continuation of application No. PCT/JP2018/011839, filed on Mar. 23, 2018.

(30) Foreign Application Priority Data

Apr. 13, 2017    (JP) .............................. JP2017-079849

(51) Int. Cl.
*H02K 1/27*    (2006.01)
(52) U.S. Cl.
CPC ................................ *H02K 1/2766* (2013.01)

(58) Field of Classification Search
CPC .. H02K 1/276; H02K 1/2766; H02K 2213/03; H02K 29/09
(Continued)

(56) References Cited

U.S. PATENT DOCUMENTS

2012/0194026 A1* 8/2012 Matsuoka ............ H02K 1/2766
                                                                310/156.53
2016/0276885 A1* 9/2016 Jurkovic .............. H02K 1/2766

FOREIGN PATENT DOCUMENTS

| CN | 102629809 A | 8/2012 |
|---|---|---|
| CN | 105009419 A | 10/2015 |

(Continued)

OTHER PUBLICATIONS

International Search Report dated Jun. 12, 2018 in PCT/JP2018/011839, filed on Mar. 23, 2018 (with English Translation).

(Continued)

*Primary Examiner* — Thomas Truong
(74) *Attorney, Agent, or Firm* — Oblon, McClelland, Maier & Neustadt, L.L.P.

(57) ABSTRACT

According to one embodiment, a rotor of an electric rotating machine includes a shaft, a rotor core, and a plurality of permanent magnets. Two first permanent magnets are arranged in line symmetry with a pole center and are arranged gradually away from the pole center as the two first permanent magnets extend from first ends toward second ends thereof. Two second permanent magnets are arranged in line symmetry with the pole center and are arranged gradually away from the pole center as the two second permanent magnets extend from third ends toward fourth ends thereof. Angles $\theta 1$, $\theta 2$ are set to satisfy the relationships of $\theta 1 > \theta 2$, and 70 degrees $\leq \theta 2 \leq 110$ degrees.

4 Claims, 6 Drawing Sheets

(58) Field of Classification Search
USPC .................................... 310/156.53, 156.56
See application file for complete search history.

(56) References Cited

FOREIGN PATENT DOCUMENTS

| | | |
|---|---|---|
| JP | 2008-306849 A | 12/2008 |
| JP | 2013-123327 A | 6/2013 |
| WO | WO 2014/155438 A1 | 10/2014 |

OTHER PUBLICATIONS

Written Opinion dated Jun. 12, 2018 in PCT/JP2018/ 011839, filed on Mar. 23, 2018.
Extended European Search Report dated Nov. 25, 2020 in European Patent Application No. 18784614.2, citing document AA therein , 7 pages.

* cited by examiner

ROTOR OF ELECTRIC ROTATING MACHINE

CROSS-REFERENCE TO RELATED APPLICATIONS

This application is a Continuation Application of PCT Application No. PCT/JP2018/011839, filed Mar. 23, 2018 and based upon and claiming the benefit of priority from Japanese Patent Application No. 2017-079849, filed Apr. 13, 2017, the entire contents of all of which are incorporated herein by reference.

FIELD

Embodiments described herein relate generally to a rotor of an electric rotating machine.

BACKGROUND

One of electric rotating machines is a permanent magnet type electric rotating machine comprising a stator having an armature wire wound thereon, and a rotor provided at the stator to be freely rotatable and having a permanent magnet embedded in a rotor core. In this type of the electric rotating machine, the surface magnetic flux density formed on the rotor core by the permanent magnet gives great influence to the torque performance and torque ripple of the electric rotating machine. For this reason, a technique of efficiently increasing the surface magnetic flux density of the rotor core by arranging a plurality of permanent magnets on one pole of the rotor core has been proposed.

However, if a plurality of permanent magnets are arranged on one pole of the rotor core, the surface magnetic flux density of the rotor core can be increased, but the value of the current supplied to the armature wire may be increased.

DETAILED DESCRIPTION

In general, according to one embodiment, there is provided a rotor of an electric rotating machine, comprising: a shaft rotating around a rotation axis; a rotor core fixed to the shaft and having a plurality of poles; and a plurality of permanent magnets arranged for the respective poles of the rotor core and having a rectangular shape as viewed from a direction of the rotation axis. When a circumferential center of one of the poles of the rotor core is referred to as a pole center and both ends in a circumferential direction are referred to as pole ends, the plurality of permanent magnets include: two first permanent magnets arranged in line symmetry with the pole center, with second ends opposite to first ends in a longitudinal direction, with respect to the first end in the longitudinal direction as viewed from the rotation axis direction being located outside in a radial direction, and arranged gradually away from the pole center while extending from the first ends towards the second ends; and two second permanent magnets arranged in line symmetry with the pole center, with fourth ends opposite to third ends in a longitudinal direction with respect to the third end in the longitudinal direction as viewed from the rotation axis direction being located outside in a radial direction, and arranged gradually away from the pole center while extending from the third ends towards the fourth ends. The two second permanent magnets are arranged so as to allow the third ends to be located more closely to the shaft side than the first ends of the two first permanent magnets and the fourth ends to be located more closely to the pole end side than the second ends of the two first permanent magnets. When an angle between first side surfaces in a short direction of the two first permanent magnets, opposite to the second permanent magnets, as viewed from the rotation axis direction is referred to as $\theta 1$ and an angle between second side surfaces in the short direction of the two second permanent magnets, on the first permanent magnet sides, is referred to as $\theta 2$, the angles $\theta 1$ and $\theta 2$ are set to satisfy: $\theta 1 > \theta 2$ and 70 degrees≤$\theta 2$ 110 degrees.

A rotor of an electric rotating machine according to the embodiments will be described hereinafter with reference to the accompanying drawings.

Figure 1:
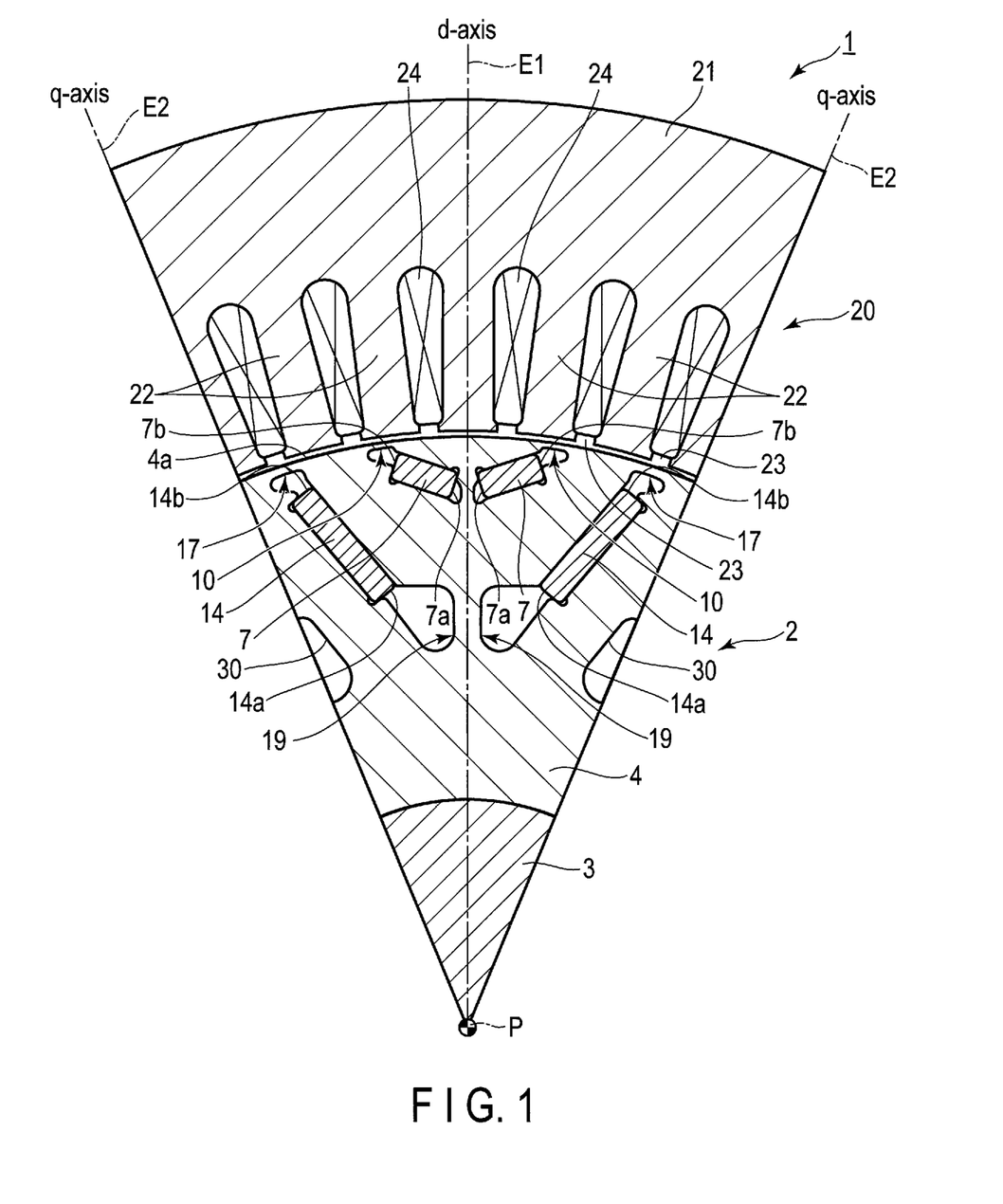
FIG. 1 is a cross-sectional view showing an electric rotating machine of embodiments, which is orthogonal to a rotation axis.

FIG. 1 is a cross-sectional view showing an electric rotating machine 1, which is orthogonal to a rotation axis P. The rotor 2 of the electric rotating machine 1 is set to have eight poles and FIG. 1 illustrates one of the poles, i.e., a ⅛ circumferential angle region.

The electric rotating machine 1 comprises a substantially cylindrical stator 20, and a rotor 2 provided on a radially inner side than the stator 20 and provided rotatably with respect to the stator 20. The stator 20 and the rotor 2 are arranged in a state in which each of their central axes is located on a common axis. In the following descriptions, the common axis is referred to as a rotation axis P, the direction of turning around the rotation axis P is referred to as a circumferential direction, and the direction orthogonal to the rotation axis P direction and the circumferential direction is referred to as the radial direction.

The stator 20 includes a substantially cylindrical stator core 21. The stator core 21 can be formed by laminating a plurality of electromagnetic steel sheets or pressing and forming soft magnetic powder. A plurality of (for example, forty-eight, in the embodiments) teeth 22 protruding toward the rotation axis P and arranged at equal intervals in the circumferential direction are integrally formed on the inner peripheral surface of the stator core 21. The teeth 22 are formed in a substantially rectangular shape in cross section. Each slot 23 is formed between adjacent teeth 22. An armature wire 24 is wound around each of the teeth 22 through the slots 23. A predetermined flux linkage is formed on the stator 20 (teeth 22) by supplying a current to the armature wire 24.

Figure 2:
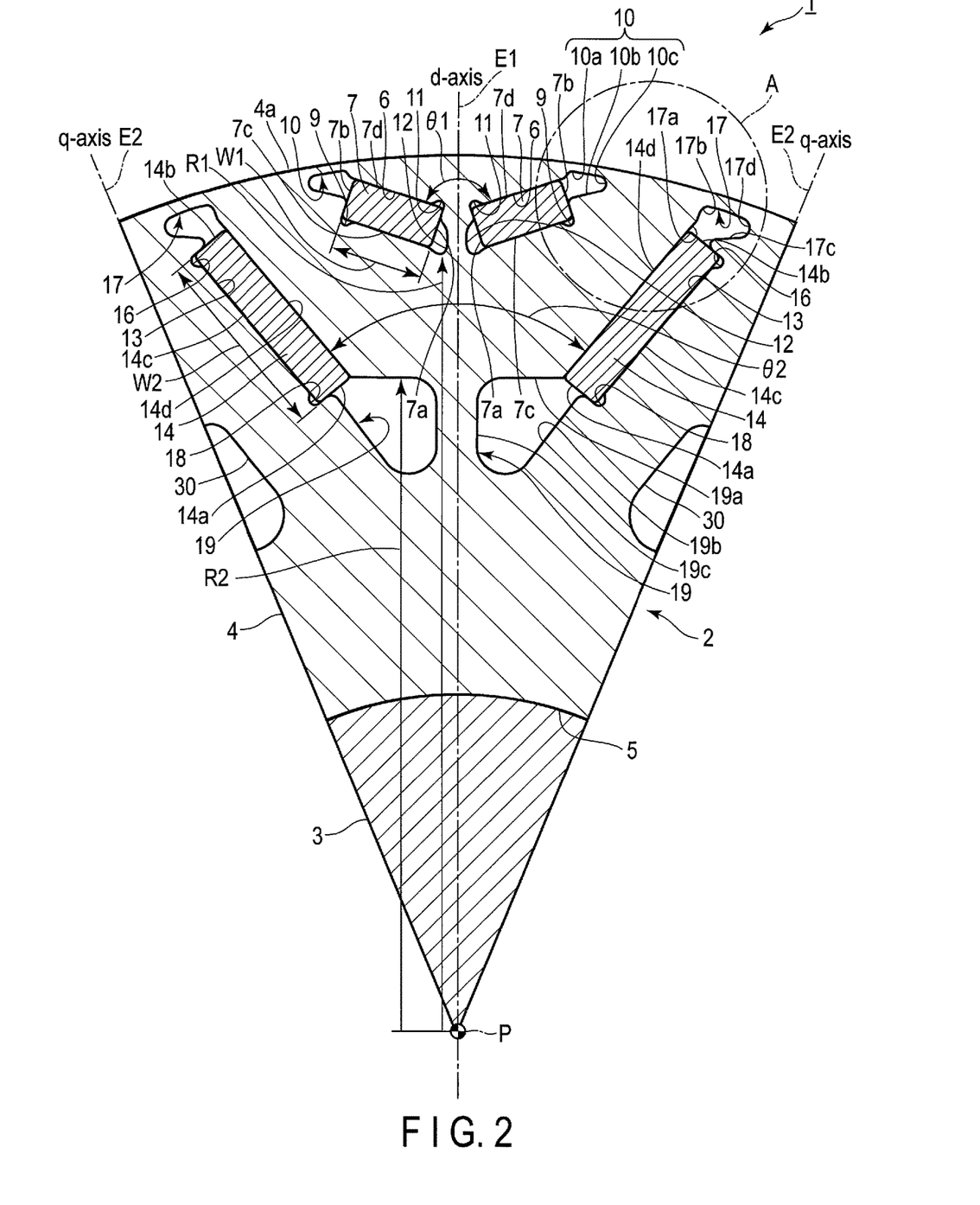
FIG. 2 is an enlarged view showing a rotor of FIG. 1.

FIG. 2 is an enlarged view showing a rotor 2 of FIG. 1.

As shown in the drawing, the rotor 2 comprises a shaft 3 extending along the rotation axis P and rotating around the rotation axis P, and a substantially cylindrical rotor core 4 externally fitted onto and fixed to the shaft 3. A through hole 5 into which the shaft 3 can be inserted or fitted by pressure is formed at the radial center of the rotor core 4.

In the rotor core 4 of the embodiments, the direction in which the flux linkage formed by the stator 20 can easily flow is referred to as a q-axis. In addition, a direction along a radial direction that is orthogonal electrically and magnetically to the q-axis is referred to as a d-axis. That is, in a case of giving a positive magnetic potential (for example, bringing the N pole of the magnet closer) to an arbitrary circumferential angle position of the outer peripheral surface 4a of the rotor core 4 while giving a negative magnetic potential (for example, bringing the S pole of the magnet closer) to another arbitrary circumferential angle position shifted by one pole (45 degrees of mechanical angle in the embodiments), and shifting the arbitrary position in the circumferential direction, the direction from the rotation axis P to an arbitrary position at the time when the largest amount of magnetic flux flows is defined as the q-axis. Then, a direction along a radial direction that is orthogonal electrically and magnetically to the q-axis is defined as a d-axis.

That is, one pole of the rotor core 4 refers to the region between the q-axes (⅛ circumferential angle region). For this reason, the rotor core 4 is configured to have eight poles. In addition, the circumferential center of one pole, in the rotor core 4 of the embodiments, is the d-axis.

In the following descriptions, the d-axis is referred to as pole center E1, and the q-axes (both ends in the circumferential direction of the ⅛ circumferential angle region) are referred to as pole ends E2.

In the rotor core 4, two first permanent magnets 7 and two second permanent magnets 14 are buried for each pole. More specifically, magnet housing holes 6 and 13 corresponding to the shapes of the permanent magnets 7 and 14 are formed in the rotor core 4, and the permanent magnets 7 and 14 are arranged so as to fill the magnet housing holes 6 and 13. The permanent magnets 7 and 14 are fixed to the magnet housing holes 6 and 13 of the rotor core 4 by, for example, an adhesive or the like.

Each of the two first permanent magnets 7 and the two second permanent magnets 14 is a rectangular plate-like magnet as viewed from the direction of the rotation axis P1.

In the following descriptions, when parts of the permanent magnets 7 and 14 are indicated, a longitudinal direction viewed from the direction of the rotation axis P1 is simply referred to as a longitudinal direction, and a short direction viewed from the direction of the rotation axis P1 is simply referred to as a short direction.

The two first permanent magnets 7 are arranged in line symmetry with the pole center E1. In addition, the two first permanent magnets 7 are arranged such that the first end (corresponding to the "first end" in the claims 7a on the side of the pole center E1 in the longitudinal direction, the second end (corresponding to the "second end" in the claims 7b on the side opposite to the first end 7a is located on a radially outer side. Moreover, two first permanent magnets 7 are arranged gradually away from the pole center E1 as the two first permanent magnets extend from first ends 7a toward second ends 7b thereof.

In the first permanent magnets 7 arranged in this manner, the magnetic flux density on the outer peripheral surface 4a side of the rotor core 4 in each of the first permanent magnets 7 becomes high, and harmonics of the surface magnetic flux density of the rotor core 4 can be reduced. In addition, the magnetic flux of the first permanent magnets 7 can easily be concentrated at the pole center E1. That is, the magnetization directions of the two first permanent magnets 7 arranged in respective ⅛ circumferential angle regions are the same as each other. That is, for example, in the two first permanent magnets 7 arranged in the respective ⅛ circumferential angle regions, the radially outer surfaces are assumed to be magnetized to the N pole. In this case, in the two first permanent magnets 7 arranged in other ⅛ circumferential angle regions adjacent in the circumferential direction, their radially outer surfaces are magnetized to the S pole.

Four flux barriers 9 to 12 (a first flux barrier 9, a second flux barrier 10, a third flux barrier 11, a fourth flux barrier 12) are formed at the longitudinal ends 7a and 7b of each first permanent magnet 7. Each of the flux barriers 9 to 12 is a hollow penetrating the rotor core 4 in an axis direction. Each of the flux barriers 9 to 12 suppresses magnetic flux leakage from the longitudinal ends 7a and 7b of the first permanent magnet 7 to the rotor core 4.

More specifically, the first flux barrier 9 is a hollow formed to extend from the first side surface 7c on the second permanent magnet 14 side in the short direction toward the second permanent magnet 14, on the second end 7b side of the first permanent magnet 7.

The second flux barrier (corresponding to a "first hollow" in the claims) 10 is a hollow formed on the second end 7b side of the first permanent magnet 7, at a position avoiding the first flux barrier 9. In addition, the second flux barrier 10 is formed to be tapered from the second end 7b of the first permanent magnet 7 toward the outer peripheral surface 4a of the rotor core 4 as viewed from the rotation axis P.

That is, in the second flux barrier 10, a first inner side surface 10a, a second inner side surface 10b, and an arcuate surface 10c are continuously formed. The first inner side surface 10a is formed substantially concentrically with the outer peripheral surface 4a of the rotor core 4. The second inner side surface 10b extends along the longitudinal direction of the first permanent magnet 7 from the approximate center of the second end 7b of the first permanent magnet 7 in the short direction. The arcuate surface 10c is formed to extend across the first inner side surface 10a and the second inner side surface 10b.

The third flux barrier 11 is a hollow formed to extend from a second side surface (corresponding to a "first side surface" in the claims) 7d opposite to the first side surface 7c in the short direction toward the outer peripheral surface 4a of the rotor core 4, at a first end 7a of the first permanent magnet 7.

The fourth flux barrier (corresponding to "third hollow" in the claims) 12 is a hollow formed on the first end 7a side of the first permanent magnet 7, at a position avoiding the third flux barrier 11.

In contrast, similarly to the first permanent magnet 7, the two second permanent magnets 14 are also arranged in line symmetry with the pole center E1. In the second permanent magnet 14, a length W2 in a longitudinal direction is set to be longer than a length W1 in the longitudinal direction of the first permanent magnet 7. For example, the length W2 is set to be approximately twice the length W1.

The two second permanent magnets 14 are arranged such that third ends (corresponding to "third ends" in the claims 14a on the pole center E1 side in the longitudinal direction, are located on a radially inner side (shaft 3 side) than the first ends 7a of the first permanent magnets 7. Furthermore, the second permanent magnets 14 are arranged such that fourth ends (corresponding to "fourth ends" in the claims) 14b on the sides opposite to the third ends 14a are located on a radially outer side with respect to the third ends 14a.

In addition, the two second permanent magnets 14 are arranged such that the fourth ends 14b are located more closely to the pole end E2 sides than to the second ends 7b of the first permanent magnets 7. Furthermore, two second permanent magnets 14 are arranged gradually away from the pole center E1 as the two first permanent magnets extend from third ends 14a toward fourth ends 14b thereof.

The magnetization directions of the two second permanent magnets 14 are the same as the magnetization directions of the first permanent magnets 7. That is, it is assumed that, for example, the radially outer surfaces, of the first permanent magnets 7 arranged in the same ⅛ circumferential angle region, are magnetized to the N pole, and the radially inner surfaces are magnetized to the S pole. In this case, the radially outer surfaces, of the second permanent magnets 14, are also magnetized to the N pole, and the radially inner surfaces are also magnetized to the S pole. The flow directions of the magnetic flux of the first permanent magnets 7 and the flow directions of the magnetic flux of the second permanent magnets 14 thereby coincide with each other. As a result, the magnetic flux of the second permanent magnets 14 compensates for the magnetic flux of the first permanent magnets 7. For this reason, the surface magnetic flux density of the rotor core 4 is increased.

At the longitudinal ends 14a and 14b of each second permanent magnet 14, four flux barriers 16 to 19 (fifth flux barrier 16, sixth flux barrier 17, seventh flux barrier 18, eighth flux barrier 19) are formed. Each of the flux barriers 16 to 19 is a hollow penetrating the rotor core 4 in the axis direction. Each of the flux barriers 16 to 19 suppresses magnetic flux leakage from the longitudinal ends 14a and 14b of the second permanent magnet 14 to the rotor core 4.

More specifically, the fifth flux barrier 16 is a hollow formed to extend from the third side surface 14c on the pole end E2 side in the short direction toward the pole end E2, on the fourth end 14b side of the second permanent magnet 14.

The sixth flux barrier (corresponding to a "second hollow" in the claims) 17 is a hollow formed on the fourth end 14b side of the second permanent magnet 14, at a position avoiding the fifth flux barrier 16. In addition, the sixth flux barrier 17 is formed to be tapered from the fourth end 14b of the second permanent magnet 14 toward the pole end E2 side as viewed from the rotation axis P.

That is, in the sixth flux barrier 17, a first inner side surface 17a, a second inner side surface 17b, a third inner side surface 17c, and an arcuate surface 17d are continuously formed. The first inner side surface 17a extends from a fourth side surface (corresponding to a "second side surface" in the claims 14d on the first permanent magnet 7 side in the short direction of the second permanent magnet 14 toward the outer peripheral surface 4a of the rotor core 4. The second inner side surface 17b temporarily expands from the first inner side surface 17a toward the first permanent magnet 7 side and then extends substantially concentrically with the outer peripheral surface 4a of the rotor core 4. The third inner side surface 17c extends obliquely from the approximate center of the second permanent magnet housing hole 13 in the short direction toward the pole end E2. The arcuate surface 17d is formed to extend across the second inner side surface 17b and the third inner side surface 17c.

The seventh flux barrier 18 is a hollow formed to extend from the third side surface 14c on the pole end E2 side in the short direction toward the pole end E2, at the third end 14a of the second permanent magnet 14.

The eighth flux barrier (corresponding to "fourth hollow" in the claims) 19 is a hollow formed on the third end 14a side of the second permanent magnet 14, at a position avoiding the seventh flux barrier 18.

That is, in the eighth flux barrier 19, a first inner side surface 19a, a second inner side surface 19b, and a third inner side surface 19c are continuously formed. The first inner surface 19a extends at a machine angle along a direction substantially orthogonal to the d axis (polar center E1) from the corner on the first permanent magnet 7 side at the third end 14a of the second permanent magnet 14. The second inner side surface 19b extends along the longitudinal direction of the second permanent magnet 14 from the approximate center of the third end 14a in the second permanent magnet housing hole 13 in the short direction. The third inner side surface 19c extends across the first inner side surface 19a and the second inner side surface 19b along the d-axis.

Besides this, in the rotor core 4, a hollow is formed substantially at the center in the radial direction of the pole end E2, and this hollow is used as a ninth flux barrier 30. The ninth flux barrier 30 is formed such that the opening area gradually increases from the radially outer side toward the radially inner side. The ninth flux barrier 30 also restricts the flow of the flux linkage of the stator 20 and the flow of the magnetic flux of the second permanent magnet 14 by making the magnetic flux hard to pass. In addition, weight reduction of the rotor core 4 can be achieved by forming the ninth flux barrier 30.

In such a configuration, a flux linkage is formed when a current is supplied to the armature wire 24 of the stator 20. A magnetic attractive force or repulsive force is generated between this flux linkage and the magnetic flux of each of the permanent magnets 7 and 14 of the rotor 2, and the rotor 2 is thereby rotated.

In addition, in the rotor 2, a q-axis magnetic path is formed between the first permanent magnet 7 and the second permanent magnet 14. In contrast, in the d-axis, almost no magnetic path is formed by the permanent magnets 7 and 14 and the flux barriers 11, 12 and 19 formed on the pole center E1 side. For this reason, a direction in which the flux linkage of the stator 20 can easily flow and a direction in which the magnetic flux can hardly flow are formed in the rotor core 4. Then, the reluctance thereby generated contributes to the rotation of the rotor 2.

Thus, the rotor 2 is efficiently rotated by the magnetic flux from the permanent magnets 7 and 14 and the reluctance torque. Then, the rotational torque of the rotor 2 can be improved.

Next, the positions of the second permanent magnets 14 will be described in detail.

First, in the two second permanent magnets 14 for each pole, angle θ2 between the fourth side surfaces 14d is set to be smaller than angle θ1 between the second side surfaces 7d of the two corresponding first permanent magnets 7. In addition, the angle θ2 is set to satisfy:

$$\theta 2 = 80 \pm 10 \text{ degrees} \quad (1)$$

For this reason, the angle is 70 degrees≤θ2≤90 degrees.

Next, the relationship in relative position between the first permanent magnet 7 and the second permanent magnet 14 will be described in detail.

Figure 3:
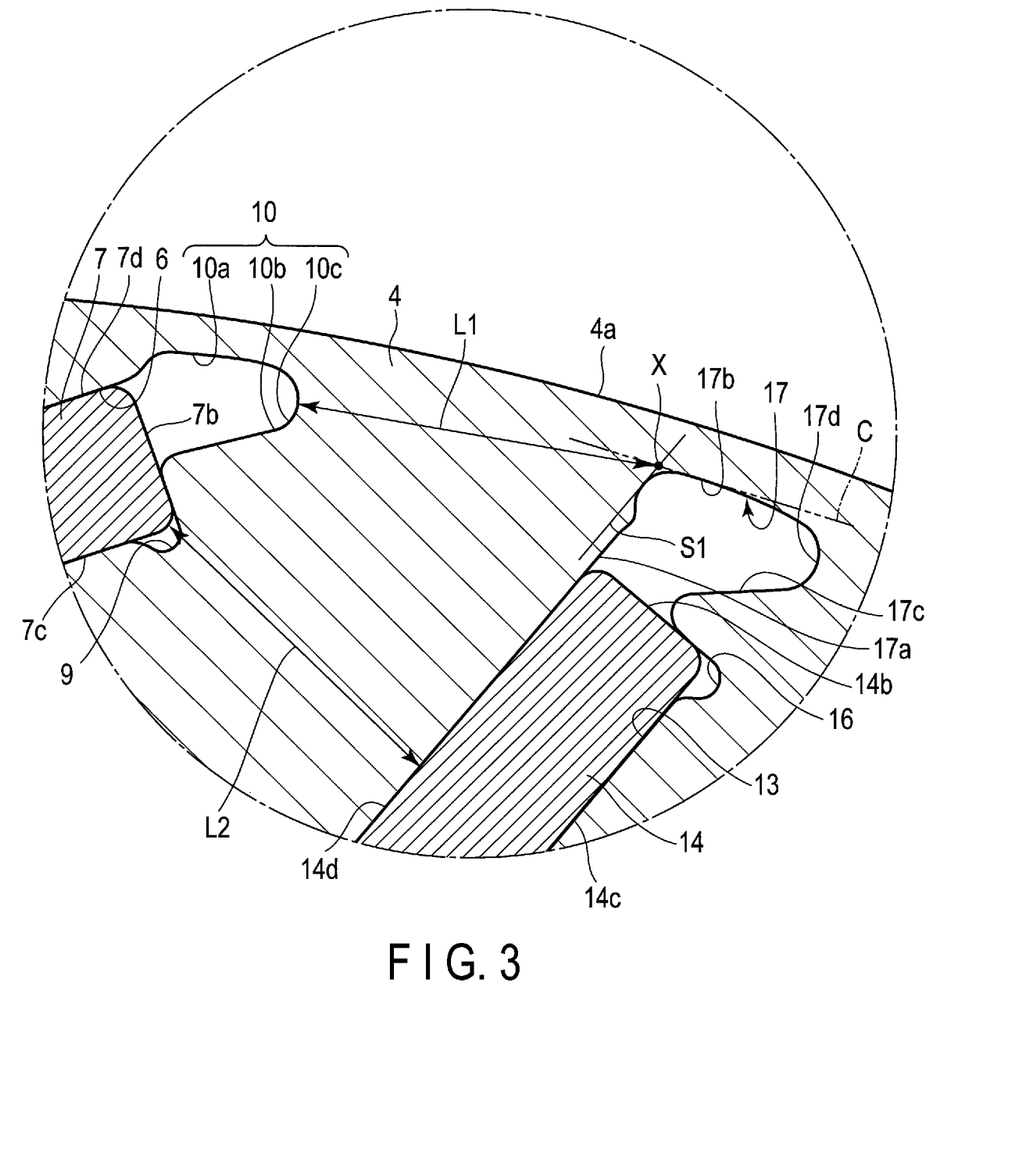
FIG. 3 is an enlarged view showing an A portion of FIG. 2.

FIG. 3 is an enlarged view showing a portion A of FIG. 2.

As shown in the drawing, an intersection of a straight line S1 which is parallel to the longitudinal direction of the second permanent magnet 14 and is in contact with the sixth flux barrier 17 on the side closest to the first permanent magnet 7, that is, a straight line S1 which is in contact with the second inner side surface 17b on the side closest to the first permanent magnet 7, and a circumcircle C of the second inner side surface 17b of the sixth flux barrier 17 centered on the rotation axis P (see FIG. 2) is referred to as X. Then, the shortest distance between the intersection X and the second flux barrier 10 of the first permanent magnet 7, that is, the distance from the intersection X to the arcuate surface 10c of the second flux barrier 10 is referred to as L1. Furthermore, the shortest distance between the first permanent magnet 7 and the second permanent magnet 14 (the shortest distance between the first side surface 7c of the first permanent magnet 7 and the fourth side surface 14d of the second permanent magnet 14) is referred to as L2. At this time, each of the shortest distances L1 and L2 is set to satisfy:

$$0.85 \leq L2/L1 \leq 1.03 \quad (2)$$

In addition, as shown in FIG. 2, the shortest distance from the rotation axis P in a case of projecting the fourth flux barrier 12 of the first permanent magnet 7 onto the pole center E1 is referred to as R1. The shortest distance R1 is the shortest distance from the rotation axis P to the projection of the fourth flux barrier 12 in the direction perpendicular to the rotation axis P. Furthermore, the longest distance from the rotation axis P (the distance to the first inner side surface 19a of the eighth flux barrier 19) in a case of projecting the eighth flux barrier 19 of the second permanent magnet 14 onto the pole center E1 is referred to as R2. The longest distance R2 is the longest distance from the rotation axis P to the projection of the eighth flux barrier 19 in the direction perpendicular to the rotation axis P. At this time, the shortest distance L1, the shortest distance R1, and the longest distance R2 are set to satisfy:

$$L1 \leq R1 - R2 \quad (3)$$

Next, the action and effect of the above-described relationship in relative position between the first permanent magnet 7 and the second permanent magnet 14 will be described.

Figure 4:
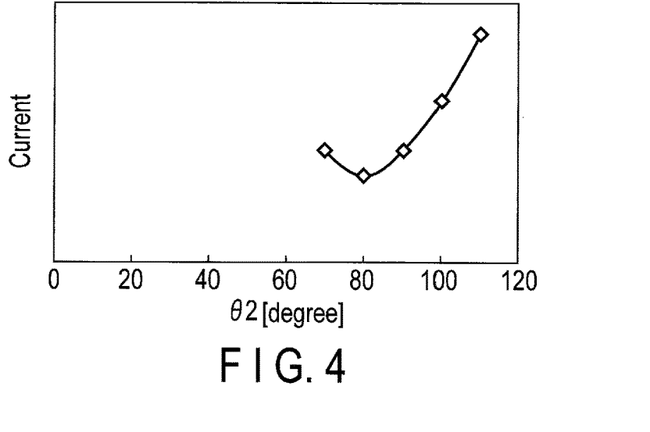
FIG. 4 is a graph showing a variation in the current value where a vertical axis represents a value of the current supplied to an armature wire and a horizontal axis represents an angle $\theta 2$.

FIG. 4 is a graph showing a variation in the current value where a vertical axis represents a value of the current supplied to the armature wire 24 of the stator 20 and a horizontal axis represents the angle θ2.

As shown in the graph, it can be conformed that the current value is lowest when the angle θ2 is 80 degrees, and the current value is suppressed to the same level as the lower limit value when the angle θ2 satisfies the above equation (1).

Figure 5:
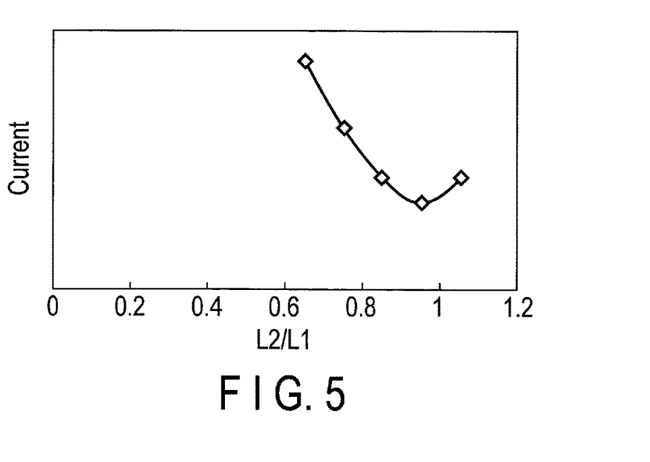
FIG. 5 is a graph showing a variation in the current value where a vertical axis represents a value of the current supplied to an armature wire and a horizontal axis represents (shortest distance L2/shortest distance L1).

FIG. 5 is a graph showing a variation in the current value where a vertical axis represents a value of the current supplied to the armature wire 24 of the stator 20 and a horizontal axis represents "shortest distance L2/shortest distance L1".

As shown in the graph, it can be confirmed that the current value is lowest when L2/L1≈0.95, and the current value is suppressed to desired current value I or less when L2/L1 satisfies the above equation (2).

Figure 6:
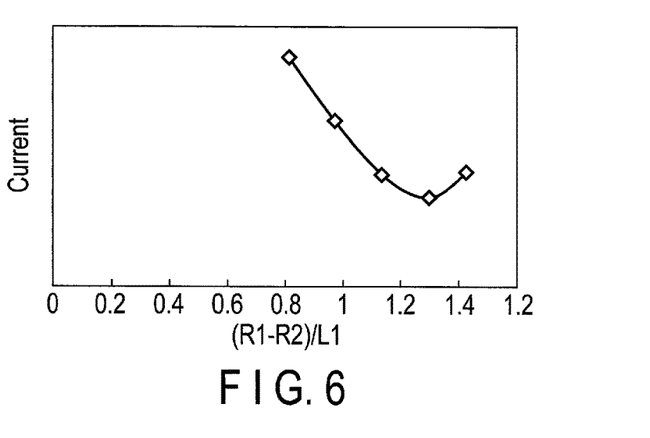
FIG. 6 is a graph showing a variation in the current value where a vertical axis represents a value of the current supplied to an armature wire and a horizontal axis represents ((shortest distance R1−longest distance R2)/shortest distance L1).

FIG. 6 is a graph showing a variation in the current value where a vertical axis represents a value of the current supplied to the armature wire 24 of the stator 20 and a horizontal axis represents "(shortest distance R1−longest distance R2)/shortest distance L1".

As shown in the graph, it can be confirmed that the current value is lowest when (R1−R2)/L1≈1.3, and the current value is suppressed to the same level as the lower limit value when each of the distances L1, R1, and R2 satisfies the above equation (3), that is, 1≤(R1−R2)/L1.

Thus, in the above-described embodiments, when the circumferential center of one pole of the rotor core 4 is referred to as the pole center E1 and both ends in the circumferential direction are referred to as the pole ends E2, two first permanent magnets 7 and two second permanent magnets 14 arranged in line symmetry with respect to the pole center E1 are provided for each pole of the rotor core 4. In addition, the first permanent magnet 7 is arranged such that the second end 7b is located radially outer side with respect to the first end 7a, and the first permanent magnet 7 is arranged gradually away from the pole center E1 as the first permanent magnet 7 extends from the first end 7a toward the second end 7b.

In contrast, the two second permanent magnets 14 are arranged such that the third ends 14a are located on a radially inner side (shaft 3 side) than the first end 7a of the first permanent magnet 7. Furthermore, second permanent magnets 14 are arranged such that fourth ends 14b are located on the radially outer side with respect to third ends 14a thereof. In addition, the two second permanent magnets 14 are arranged such that the fourth ends 14b are located more closely to the end pole E2 sides than the second ends 7b of the first permanent magnets 7, and the second permanent magnets 14 are arranged gradually away from the pole center E1 as the permanent magnets extend from the third ends 14a to the fourth ends 14b.

For this reason, the magnetic flux of the second permanent magnets 14 compensates for the magnetic flux of the first permanent magnets 7, and the surface magnetic flux density of the rotor core 4 can be increased. Moreover, a direction in which the flux linkage of the stator 20 easily flows and a direction in which the flux linkage does not easily flow are formed in the rotor core 4, and the reluctance generated thereby can also be used for the rotation of the rotor 2. As a result, the rotational torque of the rotor 2 can be improved.

Then, in such a configuration, in the two second permanent magnets 14 for each pole, angle θ2 between the fourth side surfaces 14d is set to be smaller than angle θ1 between the second side surfaces 7d of the two corresponding first permanent magnets 7. Furthermore, the angle θ2 is set to satisfy the above equation (1). For this reason, the torque of the rotor 2 can be increased while reducing the current value supplied to the armature wire 24 of the stator 20.

In addition to satisfying the above equation (1), the current value supplied to the armature wire 24 of the stator 20 can be certainly reduced by setting each of the shortest distances L1 and L2 (see FIG. 2) to satisfy the above equation (2).

Furthermore, in addition to satisfying the above equation (1), the current value supplied to the armature wire 24 of the stator 20 can be certainly reduced by setting each of the shortest distances L1 and R1 and the longest distance R2 (see FIG. 2) to satisfy the above equation (3).

In the above embodiments, stator core 21 comprises forty-eight teeth 22. However, the embodiments are not limited to this, but the number of teeth 22 may be set to any number that enables the rotor 2 to rotate.

In addition, in the above-described embodiments, each of the flux barriers 9 to 12, 16 to 19, and 30 is described as a hollow formed in the rotor core 4. However, the embodiments are not limited to this, but may be configured to make the magnetic flux hard to pass. For example, the hollow of each of the flux barriers 9 to 12, 16 to 19, and 30 may be filled with a resin or the like. The mechanical strength of the rotor core 4 can be increased by filling the hollow with the resin.

According to at least one of the embodiments described above, the magnetic flux of the second permanent magnet 14 compensates for the magnetic flux of the first permanent magnet 7, and the surface magnetic flux density of the rotor core 4 can be increased. Moreover, a direction in which the flux linkage of the stator 20 easily flows and a direction in which the flux linkage does not easily flow are formed in the rotor core 4, and the reluctance generated thereby can also be used for the rotation of the rotor 2. As a result, the rotational torque of the rotor 2 can be improved.

Then, in such a configuration, in the two second permanent magnets 14 for each pole, the angle θ2 on the opening side (radially outer side) is set to be smaller than angle the θ1 of the opening side (radially outer side) of two corresponding first permanent magnets 7. Furthermore, the angle θ2 is set to satisfy the above equation (1). For this reason, the rotational torque of the rotor 2 can be increased while reducing the current value supplied to the armature wire 24 of the stator 20.

Furthermore, in addition to satisfying the above equation (1), the current value supplied to the armature wire 24 of the stator 20 can be certainly reduced by setting each of the shortest distances L1 and L2 (see FIG. 2) to satisfy the above equation (2).

Moreover, in addition to satisfying the above equation (1), the current value supplied to the armature wire 24 of the stator 20 can be certainly reduced by setting each of the shortest distances L1 and R1 and the longest distance R2 (see FIG. 2) to satisfy the above equation (3).

Other Embodiment

Next, a rotor 2 of an electric rotating machine 1 according to another embodiment will be described. The rotor 2 of the present embodiment can increase the torque of the electric rotating machine 1 and can contribute to increasing the output of the electric rotating machine 1. In addition, the electric rotating machine 1 of the present embodiment is configured similarly to the electric rotating machine of the above-described embodiments, except elements described below.

First, the positions of the first permanent magnet 7 and the second permanent magnet 14 of the present embodiment will be described. In the present embodiment, too, angle θ2 is set to be smaller than angle θ1. In addition, the angle θ2 is set to satisfy:

$$\theta 2 = 100 \pm 10 \text{ degrees} \tag{4}$$

For this reason, 90 degrees ≤ θ2 ≤ 110 degrees.

Next, the relationship in relative position between the first permanent magnet 7 and the second permanent magnet 14 will be described in detail. In the present embodiment, the shortest distances L1 and L2 are set to satisfy:

$$0.83 \le L2/L1 \le 1.07 \tag{5}$$

In addition, the shortest distance L1, the shortest distance R1, and the longest distance R2 are set to satisfy:

$$1.81 \le (R1-R2)/L1 \le 2.14 \tag{6}$$

Next, the action and effect of the above-described relationship in relative position between the first permanent magnet 7 and the second permanent magnet 14 will be described.

Figure 7:
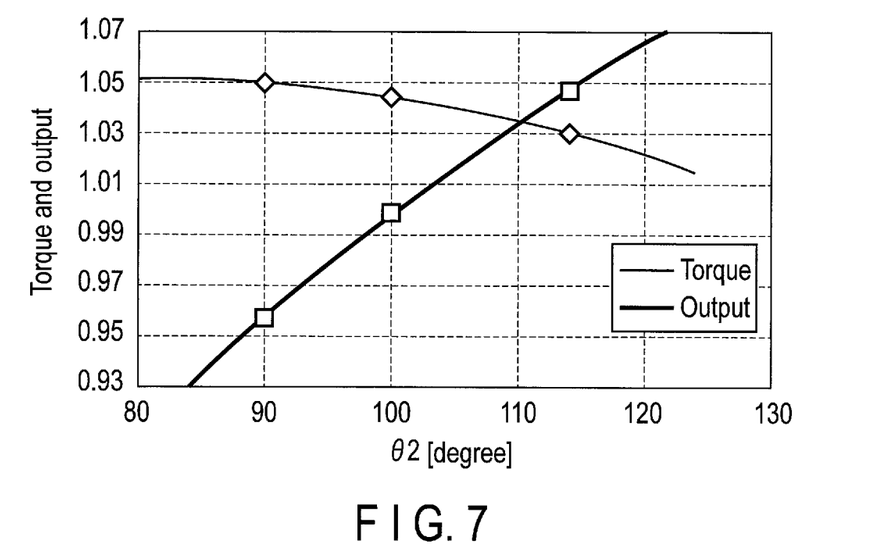
FIG. 7 is a graph showing a variation in torque and output of the electric rotating machine where a vertical axis represents a torque value and an output value of the electric rotating machine and the horizontal axis represents the angle $\theta 2$.

FIG. 7 is a graph showing a variation in torque and output of the electric rotating machine 1 where a vertical axis represents a torque value and an output value of the electric rotating machine 1 and the horizontal axis represents the angle θ2. In FIG. 7, the torque value and the output value are represented as relative values.

As shown in the graph, it can be confirmed that the torque value of the electric rotating machine 1 becomes maximum when the angle θ2 is substantially 90 degrees. Then, it can be confirmed that the torque of the electric rotating machine 1 decreases as the angle θ2 becomes larger than 90 degrees and that the reduction of the torque of the electric rotating machine 1 becomes larger when the angle θ2 substantially exceeds 110 degrees. In contrast, it can be confirmed that the output of the electric rotating machine 1 increases as the angle θ2 becomes larger than 90 degrees. When the angle θ2 is substantially 110 degrees, the graph showing the change in torque intersects the graph showing the change in output. Therefore, the electric rotating machine 1 having a large torque and a large output when the angle θ2 satisfies the above equation (4), can be obtained.

When the torques of two types of electric rotating machines 1 having the same size are compared, the torque of the electric rotating machine 1 where 90 degrees ≤ θ2 ≤ 110 degrees can be made larger than the torque of the electric rotating machine 1 where θ2<90 degrees. Alternatively, when the sizes and weights of two types of electric rotating machines 1 having the same torque are compared, the electric rotating machine 1 where 90 degrees ≤ θ2 ≤ 110 degrees can be made smaller and lighter than the electric rotating machine 1 where θ2<90 degrees. For example, in the electric rotating machine 1 where the angle θ2 is 90 degrees ≤ θ2 ≤ 110 degrees, the diameter of the rotor 2 (rotor core 4) can be reduced since the radial length of the arrangement region of the second permanent magnets 14 can be reduced as compared with the electric rotating machine 1 where θ2<90 degrees.

From the above, the torque of the electric rotating machine 1 can be increased by setting 90 degrees ≤ θ2 ≤ 110 degrees. Alternatively, the size and weight of the rotor 2 (the rotor core 4) can be reduced. Alternatively, the size and weight of the rotor 2 (the rotor core 4) can be reduced while increasing the torque of the electric rotating machine 1.

Moreover, the energy efficiency can be improved since the output of the electric rotating machine 1 can be increased by setting the angle θ2 to 90 degrees or more.

Figure 8:
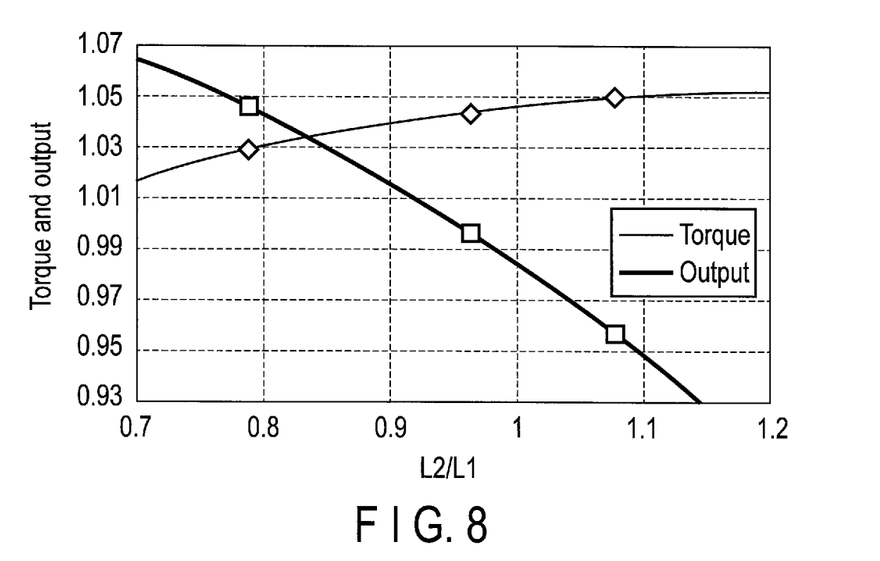
FIG. 8 is a graph showing a variation in torque and output of the electric rotating machine where a vertical axis represents a torque value and an output value of the electric rotating machine and a horizontal axis represents (shortest distance L2/shortest distance L1).

FIG. 8 is a graph showing a variation in torque and output of the electric rotating machine 1 where a vertical axis represents a torque value and an output value of the electric rotating machine 1 and a horizontal axis represents (shortest distance L2/shortest distance L1). In FIG. 8, the torque value and the output value are represented as relative values.

As shown in the graph, it can be confirmed that when L2/L1 is substantially 0.83, the graph showing the variation in torque intersects the graph showing the variation in output. It can be confirmed that when L2/L1 is substantially less than or equal to 1.07, the output is maintained with almost no decrease in torque of the electric rotating machine 1. Therefore, the electric rotating machine 1 having a large torque and a large output when L2/L1 satisfies the above equation (5) can be obtained.

Figure 9:
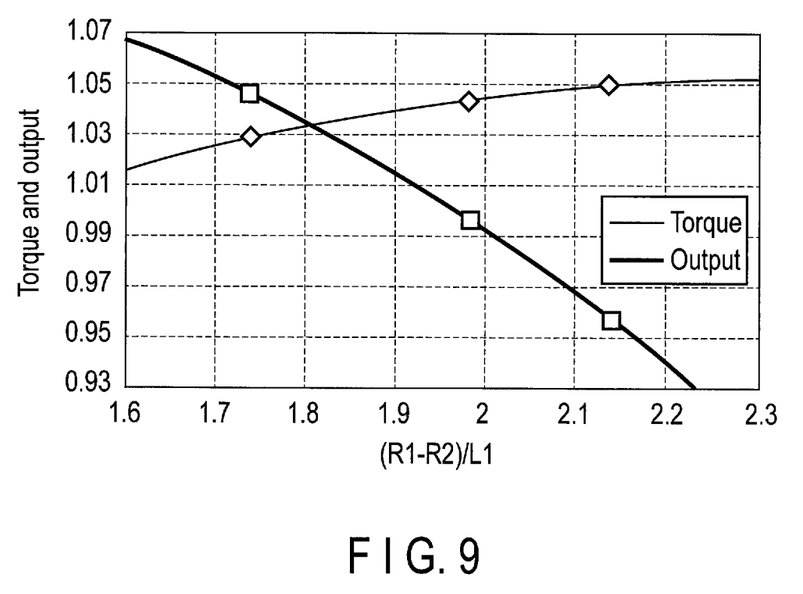
FIG. 9 is a graph showing a variation in torque and output of the electric rotating machine where a vertical axis represents a torque value and an output value of the electric rotating machine and a horizontal axis represents ((shortest distance R1−longest distance R2)/shortest distance L1).

FIG. 9 is a graph showing a variation in torque and output of the electric rotating machine 1 where a vertical axis represents a torque value and an output value of the electric rotating machine 1 and a horizontal axis represents ((shortest distance R1–longest distance R2)/shortest distance L1).

As shown in the graph, it can be confirmed that when (R1–R2)/L1 is substantially 1.81, the graph showing the variation in torque intersects the graph showing the variation in output. It can be confirmed that when (R1–R2)/L1 is substantially less than or equal to 2.14, the output is maintained with almost no decrease in torque of the electric rotating machine 1. Therefore, the electric rotating machine 1 having a large torque and a large output when (R1–R2)/L1 satisfies the above equation (6), can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotor of an electric rotating machine, comprising:
a shaft rotating around a rotation axis;
a rotor core fixed to the shaft and having a plurality of poles; and
a plurality of permanent magnets arranged for the respective poles of the rotor core and having a rectangular shape as viewed from a direction of the rotation axis, wherein
when a circumferential center of one of the poles of the rotor core is referred to as a pole center and both ends in a circumferential direction are referred to as pole ends, the plurality of permanent magnets include:
two first permanent magnets arranged in line symmetry with the pole center, with second ends opposite to first ends in a longitudinal direction, with respect to the first end in the longitudinal direction as viewed from the rotation axis direction being located outside in a radial direction, and arranged gradually away from the pole center while extending from the first ends towards the second ends; and
two second permanent magnets arranged in line symmetry with the pole center, with fourth ends opposite to third ends in a longitudinal direction with respect to the third end in the longitudinal direction as viewed from the rotation axis direction being located outside in a radial direction, and arranged gradually away from the pole center while extending from the third ends towards the fourth ends,
the two second permanent magnets are arranged so as to allow the third ends to be located more closely to the shaft side than the first ends of the two first permanent magnets and the fourth ends to be located more closely to the pole end side than the second ends of the two first permanent magnets, and
when an angle between first side surfaces in a short direction of the two first permanent magnets, opposite to the second permanent magnets, as viewed from the rotation axis direction is referred to as $\theta 1$ and an angle between second side surfaces in the short direction of the two second permanent magnets, on the first permanent magnet sides, is referred to as $\theta 2$, the angles $\theta 1$ and $\theta 2$ are set to satisfy:

$\theta 1 > \theta 2$ and 70 degrees $\leq \theta 2 \leq$ 110 degrees, wherein
the angles $\theta 1$ and $\theta 2$ are set to satisfy:

70 degrees $\leq \theta 2 \leq$ 90 degrees, first hollows extending from the second ends of the first permanent magnets toward a peripheral surface side are formed and second hollows extending from the fourth ends of the second permanent magnets toward the peripheral surface side are formed, in the rotor core, and
when an intersection of a straight line which is parallel to the second side surface of the second permanent magnet and is in contact with the second hollow on a side closest to the first permanent magnet, and a circumcircle of the second hollow centered on the rotation axis is referred to as X, when a shortest distance between the intersection X and the first hollow is referred to as L1, and when a shortest distance between the first permanent magnet and the second permanent magnet is referred to as L2, each of the shortest distances L1 and L2 is set to satisfy:

$0.85 \leq L2/L1 \leq 1.03$.

2. The rotor of the electric rotating machine of claim 1, wherein
third hollows extending from the first ends of the first permanent magnets toward the pole center side are formed and fourth hollows extending from the third ends of the second permanent magnets toward the pole center side are formed, in the rotor core, and
when a shortest distance from the rotation axis in a case of projecting the third hollow onto the pole center is referred to as R1, and when a longest distance from the rotation axis in a case of projecting the fourth hollow onto the pole center is referred to as R2, the shortest distances L1 and R1 and the longest distance R2 are set to satisfy:

$L1 \leq R1 - R2$.

3. The rotor of the electric rotating machine of claim 1, wherein
the angles $\theta 1$ and $\theta 2$ are set to satisfy:

90 degrees $\leq \theta 2 \leq$ 110 degrees, first hollows extending from the second ends of the first permanent magnets toward a peripheral surface side are formed and second hollows extending from the fourth ends of the second permanent magnets toward the peripheral surface side are formed, in the rotor core, and
when an intersection of a straight line which is parallel to the second side surface of the second permanent magnet and is in contact with the second hollow on a side closest to the first permanent magnet, and a circumcircle of the second hollow centered on the rotation axis is referred to as X, when a shortest distance between the intersection X and the first hollow is referred to as L1, and when a shortest distance between the first permanent magnet and the second permanent magnet is referred to as L2, each of the shortest distances L1 and L2 is set to satisfy:

$0.83 \leq L2/L1 \leq 1.07$.

4. The rotor of the electric rotating machine of claim 3, wherein third hollows extending from the first ends of the first permanent magnets toward the pole center side are formed and fourth hollows extending from the third ends of the second permanent magnets toward the pole center side are formed, in the rotor core, and when a shortest distance from the rotation axis in a case of projecting the third hollow onto the pole center is referred to as R1, and when a longest distance from the rotation axis in a case of projecting the fourth hollow onto the pole center is referred to as R2, the shortest distances L1 and R1 and the longest distance R2 are set to satisfy:

$1.81 \leq (R1-R2)/L1 \leq 2.14$.

* * * * *